United States Patent
Strange et al.

(10) Patent No.: US 10,239,504 B2
(45) Date of Patent: Mar. 26, 2019

(54) SYSTEM AND METHOD PERTAINING TO BRAKING OF A VEHICLE COMBINATION WHICH COMPRISES A TRACTOR VEHICLE WITH A TOWED VEHICLE

(71) Applicant: Scania CV AB, Södertälje (SE)

(72) Inventors: Thomas Strange, Nykvarn (SE); Martin Edinger, Hägersten (SE)

(73) Assignee: SCANIA CV AB (SE)

( * ) Notice: Subject to any disclaimer, the term of this patent is extended or adjusted under 35 U.S.C. 154(b) by 60 days.

(21) Appl. No.: 15/501,875

(22) PCT Filed: Aug. 5, 2015

(86) PCT No.: PCT/SE2015/050845
§ 371 (c)(1),
(2) Date: Feb. 6, 2017

(87) PCT Pub. No.: WO2016/024901
PCT Pub. Date: Feb. 18, 2016

(65) Prior Publication Data
US 2017/0240152 A1 Aug. 24, 2017

(30) Foreign Application Priority Data
Aug. 13, 2014 (SE) .................................... 1450936-8

(51) Int. Cl.
*B60T 8/17* (2006.01)
*B60T 7/20* (2006.01)
*B60T 8/18* (2006.01)

(52) U.S. Cl.
CPC .............. *B60T 8/1708* (2013.01); *B60T 7/20* (2013.01); *B60T 8/1887* (2013.01); *B60Y 2410/111* (2013.01)

(58) Field of Classification Search
CPC ......... B60T 8/1708; B60T 7/20; B60T 8/1887
See application file for complete search history.

(56) References Cited

U.S. PATENT DOCUMENTS

| 4,768,840 A | 9/1988 | Sullivan et al. ............. 303/6.01 |
| 5,333,940 A * | 8/1994 | Topfer ..................... B60T 7/20 |
| | | 303/15 |

(Continued)

FOREIGN PATENT DOCUMENTS

| DE | 10 2006 039 764 A1 | 2/2008 |
| EP | 0 370 671 A2 | 5/1990 |

(Continued)

OTHER PUBLICATIONS

Supplementary European Search Report dated Mar. 13, 2018 issued in corresponding European Application No. EP 15 83 1703.

(Continued)

*Primary Examiner* — Genna M Mott
(74) *Attorney, Agent, or Firm* — Ostrolenk Faber LLP (57) ABSTRACT

A method pertaining to braking of a vehicle combination (100) which combination comprises a tractor vehicle (110) with a towed vehicle (112), where both are configured to be braked. The tractor vehicle (110) is provided with a first control unit (200) having a function for regulation of coupling force between the tractor vehicle (110) and the towed vehicle (112). Regulation of coupling force includes adaptation data and the towed vehicle bears an ID specification. The method includes the steps of: transferring the ID specification from the towed vehicle (112) to the tractor vehicle (110); during a braking process, registering adaptation data associated with the braking process together with the ID specification. Also a computer program product includes program code (P) for a computer (200; 205) for implementing the method. Also a system pertaining to braking of a vehicle combination (100) and to a vehicle combination (100) is equipped with the system.

21 Claims, 3 Drawing Sheets

(56) References Cited

U.S. PATENT DOCUMENTS

| | | | |
|---|---|---|---|
| 2003/0038534 A1 | 2/2003 | Barnett | 303/7 |
| 2003/0109971 A1 | 6/2003 | Knosmann et al. | 701/29 |
| 2004/0083040 A1 | 4/2004 | Parrott et al. | 701/32 |
| 2009/0093928 A1 | 4/2009 | Getman et al. | 701/37 |
| 2010/0007200 A1 | 1/2010 | Pelosse | 303/7 |
| 2010/0156667 A1 | 6/2010 | Bennie et al. | 340/902 |
| 2011/0042154 A1* | 2/2011 | Bartel | B60L 7/10 180/11 |
| 2014/0180553 A1 | 6/2014 | Eckert et al. | 701/70 |

FOREIGN PATENT DOCUMENTS

| | | |
|---|---|---|
| EP | 2 269 880 A1 | 1/2011 |
| EP | 2 570 312 A1 | 3/2013 |
| GB | 2499459 A | 8/2013 |
| WO | WO 87/05571 | 9/1987 |
| WO | WO 03/047933 A2 | 6/2003 |

OTHER PUBLICATIONS

International Search Report dated Nov. 27, 2015 in corresponding PCT International Application No. PCT/SE2015/050845.
Written Opinion dated Nov. 27, 2015 in corresponding PCT International Application No. PCT/SE2015/050845.

\* cited by examiner

SYSTEM AND METHOD PERTAINING TO BRAKING OF A VEHICLE COMBINATION WHICH COMPRISES A TRACTOR VEHICLE WITH A TOWED VEHICLE

CROSS-REFERENCE TO RELATED APPLICATIONS

The present application is a 35 U.S.C. §§ 371 national phase conversion of PCT/SE2015/050845, filed Aug. 5, 2015, which claims priority of Swedish Patent Application No. 1450936-8, filed Aug. 13, 2014, the contents of which are incorporated by reference herein. The PCT International Application was published in the English language.

TECHNICAL FIELD

The present invention relates to a method pertaining to braking of a vehicle combination which comprises a tractor vehicle with a towed vehicle. The invention relates also to a computer program product comprising program code for a computer for implementing a method according to the invention. The invention relates also to a system pertaining to braking of a vehicle combination which comprises a tractor vehicle with a towed vehicle and to a motor vehicle combination which is equipped with the system.

BACKGROUND

Vehicle combinations comprising a tractor vehicle and a towed vehicle may be equipped with electronic brake systems (EBS) which may comprise a function for regulation of coupling force (CFC, coupling force control). Said CFC function is suited to continuously controlling the distribution of braking force between brake systems of said tractor vehicle and said towed vehicle. This makes it possible for brake action to be controlled in such a way that forces acting at a coupling point between said tractor vehicle and said towed vehicle are minimized or eliminated, resulting in a so-called brake balance between the tractor vehicle and the towed vehicle. It is desirable and in some countries even legally required that both said tractor vehicle and said towed vehicle be capable of braking their own weight in any operating situation.

An existing electronic brake system comprises a first brake control unit situated on said tractor vehicle and a second brake control unit situated on said towed vehicle, said first brake control unit being a primary control unit and said second brake control unit a secondary control unit. Said first control unit performs said function for regulation of coupling force and is therefore arranged to continuously determine and control the distribution of braking force for the vehicle combination. Said second brake control unit is arranged to control brake action pertaining to said towed vehicle on the basis of said brake force distribution determined by said first brake control unit.

Said coupling force function comprises an iterative method which uses a number of parameters, e.g. the respective weights of the tractor vehicle and the towed vehicle, the prevailing acceleration or retardation of the vehicle combination, the rotation speeds of the latter's wheels etc. as a basis for determining adaptation data continuously during braking of the vehicle combination. Said adaptation data pertain both to said tractor vehicle and to said towed vehicle.

A number of braking processes of the vehicle combination are currently required for said CFC function to operate. An initial assumption for said function is a suitable braking force distribution, although this assumption may be more or less appropriate. Typically five to ten braking processes of the vehicle combination may be necessary before said function can conduct control of braking force distribution in a more appropriate way whereby forces at said coupling point between the tractor vehicle and the towed vehicle can be effectively minimized during braking processes. The fact that the vehicle combination has to go through a number of braking processes before said CFC function can determine brake action distribution in an optimum way means that said coupling point between the vehicles is subject to undesirable effects which may lead inter alia to undesirable brake wear. In the worst case said undesirable effects will lead to a non-optimum braking method, with potential consequent risk to the safety of other road users.

A driver of said vehicle combination may have problems when braking the vehicle combination before said function intervenes. He/she may find that said towed vehicle is not braked sufficiently and "pushes" the tractor vehicle. This may of course be disturbing and stressful for the driver of the vehicle combination, with potential consequent adverse effects with regard to traffic safety.

It should be noted that different towed vehicles may be coupled to a tractor vehicle. When connecting a different towed vehicle, said CFC function is suited to applying initial values for adaptation of brake action distribution. This makes it possible for said intervention process to be reliable in that a number of braking processes are required to arrive at suitable control of brake systems on both said tractor vehicle and said towed vehicle.

SUMMARY OF THE INVENTION

There is therefore a need for a reliable way of minimizing the number of braking processes required for said CFC function to intervene.

There is a need for an effective, reliable and user-friendly way of quickly achieving appropriate brake action distribution on a vehicle combination which comprises a tractor vehicle and a towed vehicle.

One object of the present invention is to propose a novel and advantageous method pertaining to braking of a vehicle combination which comprises a tractor vehicle with a towed vehicle.

Another object of the invention is to propose a novel and advantageous system pertaining to braking of a vehicle combination which comprises a tractor vehicle with a towed vehicle and a novel and advantageous computer program for controlling braking of a vehicle combination which comprises a tractor vehicle with a towed vehicle.

A further object of the invention is propose an alternative method pertaining to braking of a vehicle combination which comprises a tractor vehicle with a towed vehicle, an alternative system pertaining to braking of a vehicle combination which comprises a tractor vehicle with a towed vehicle and an alternative computer program for controlling braking of a vehicle combination which comprises a tractor vehicle with a towed vehicle.

One aspect of the present invention is a proposed method pertaining to braking of a vehicle combination which comprises a tractor vehicle with a towed vehicle where both said tractor vehicle and said towed vehicle are arranged to be braked and where said tractor vehicle is provided with a first control unit comprising a function for regulation of coupling force between said tractor vehicle and said towed vehicle, where said regulation of coupling force comprises so-called adaptation data and where said towed vehicle bears an ID (identification) specification which presents a unique identity for said towed vehicle. The method comprises the steps of:
    transferring said ID specification from said towed vehicle to said tractor vehicle;
    during a braking process, registering adaptation data associated with said braking process together with said ID specification.

The step of transferring said ID specification from said towed vehicle to said tractor vehicle may take place automatically, in which case an operator of the vehicle need not input any data. In one example of a version, adaptation data comprising adaptation data concerning said towed vehicle are registered for a number of different braking processes of the vehicle combination. Said adaptation data may in the method according to the invention be saved in a memory of said first control unit together with said ID specification.

In one example of a version said ID specification comprises a vehicle identification number (VIN). Towed vehicles are currently provided with a unique identification number which may be stored in said second control unit of said towed vehicle. When said towed vehicle is being coupled to said tractor vehicle, said ID specification may be transferred automatically from the second control unit to the first control unit in a suitable way, e.g. via a link provided for the purpose.

The method may comprise the step of:
    providing said function for regulation of coupling force between said tractor vehicle and said towed vehicle with adaptation data thus registered. This makes it possible during the coupling of said tractor vehicle to said towed vehicle for said function to use said previously determined adaptation data as a basis for effective regulation of coupling force.

The method may comprise the steps of:
    determining, during coupling of said tractor vehicle to a towed vehicle with a certain ID specification, whether said tractor vehicle's first control unit already has adaptation data registered in it which pertain to the respective towed vehicle; and
    using these already registered adaptation data as a basis for said function for regulation of coupling force between said tractor vehicle and said towed vehicle.

This means that previously known adaptation data registered in the first control unit during previous braking processes may with advantage be used when said towed vehicle is again being coupled to said tractor vehicle, making it possible to achieve a short intervention process of said function.

The method may comprise the step of:
    for said tractor vehicle's first control unit, continuously registering adaptation data and ID specifications for different towed vehicles coupled to the tractor vehicle.

This makes it possible for adaptation data and respective ID specifications for a set of towed vehicles to be stored in a memory of the first unit for use in accordance with the method according to the invention. The result is a method which may for example easily be used with a vehicle fleet.

One aspect of the present invention is a proposed system pertaining to braking of a vehicle combination which comprises a tractor vehicle with a towed vehicle where both said tractor vehicle and said towed vehicle are arranged to be braked and where said tractor vehicle is provided with a first control unit comprising a function for regulation of coupling force between said tractor vehicle and said towed vehicle, where said regulation of coupling force comprises so-called adaptation data and where said towed vehicle bears an ID specification. Said system comprises:
    means suited to transferring said ID specification from said towed vehicle to said tractor vehicle;
    means suited, during a braking process, to registering adaptation data associated with said braking process together with said ID specification.

The system may comprise:
    means suited to providing said function for regulation of coupling force between said tractor vehicle and said towed vehicle with adaptation data thus registered.

The system may comprise:
    means suited, during coupling of said tractor vehicle to a towed vehicle with a certain ID specification, to determining whether said tractor vehicle's first control unit already has adaptation data registered in it which pertain to the respective towed vehicle; and
    means suited to using these already registered adaptation data as a basis for said function for regulation of coupling force between said tractor vehicle and said towed vehicle.

Said means suited, during coupling of said tractor vehicle to a towed vehicle with certain ID specification, to determining whether said tractor vehicle's first control unit has adaptation data already registered in it which pertain to the respective towed vehicle, may be suited to automatically determining, during coupling of said tractor vehicle to a towed vehicle with certain ID specification, whether said tractor vehicle's first control unit has adaptation data already registered in it which pertain to the respective towed vehicle.

The system may comprise:
    means suited, for said tractor vehicle's first control unit, to continuously registering adaptation data and ID specifications for different towed vehicles coupled to the tractor vehicle.

Said towed vehicle may be provided with a second control unit arranged to bear said ID specification. Said first control unit may be arranged to respond to coupling of said tractor vehicle to said towed vehicle by demanding said ID specification from said second control unit. Said second control unit may be arranged to send said ID specification to said first control unit in response to such a demand.

One aspect of the present invention is a proposed motor vehicle combination provided with a system according to the invention. The vehicle combination may be any from among a truck, bus, car, timber carrier, contractor machine or forestry machine. Said vehicle combination comprises a tractor vehicle and a tractor vehicle which is provided with a function for regulating the vehicle combination's coupling force, and with an ID specification.

One aspect of the present invention is a proposed computer program pertaining to braking of a vehicle combination which comprises a tractor vehicle with a towed vehicle, which program comprises program code for causing an electronic control unit or a computer connected to the electronic control unit to perform steps according to the invention.

One aspect of the present invention is a proposed computer program pertaining to braking of a vehicle combination which comprises a tractor vehicle with a towed vehicle, which program comprises program code for causing an electronic control unit or a computer connected to the electronic control unit to perform steps according to any one of claims 1-4 when said program code is run on said control unit or said computer.

One aspect of the present invention is a proposed computer program pertaining to braking of a vehicle combination which comprises a tractor vehicle with a towed vehicle, which program comprises program code stored on a computer-readable medium for causing an electronic control unit or a computer connected to the electronic control unit to perform steps according to the invention.

One aspect of the present invention is a proposed computer program pertaining to braking of a vehicle combination which comprises a tractor vehicle with a towed vehicle, which program comprises program code stored on a computer-readable medium for causing an electronic control unit or a computer connected to the electronic control unit to perform steps according to the invention when said program code is run on said control unit or said computer.

One aspect of the present invention is a proposed computer program product comprising a program code stored on a computer-readable medium for performing method steps according to the invention when said computer program is run on an electronic control unit or a computer connected to the electronic control unit.

One aspect of the present invention is a proposed computer program product comprising a program code stored in a non-volatile way on a computer-readable medium for performing method steps according to the invention when said program code is run on an electronic control unit or a computer connected to the electronic control unit.

Further objects, advantages and novel features of the present invention will be indicated to one skilled in the art by the following details, as also by implementing the invention. Whereas the invention is described below, it should be noted that it is not limited to the specific details described. One skilled in the art who has access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read in conjunction with the accompanying drawings, in which the same reference notations are used for similar items in the various drawings, and in which.

DETAILED DESCRIPTION OF THE DRAWINGS

Figure 1:
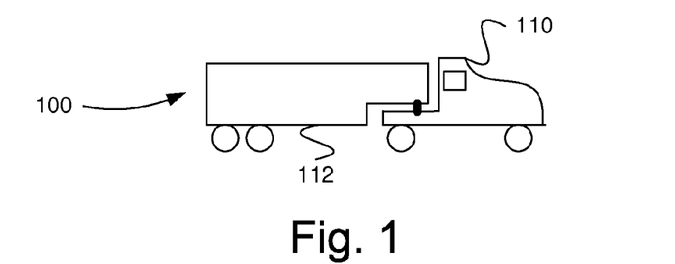
FIG. 1 illustrates schematically a motor vehicle combination according to an embodiment of the invention.

FIG. 1 depicts a sideview of a motor vehicle combination 100. The vehicle combination exemplified comprises a tractor vehicle 110 and a towed vehicle 112. The vehicle combination may be a heavy vehicle, e.g. a truck with trailer.

Said towed vehicle 112 is detachably connected to said tractor vehicle 110, making it possible for said towed vehicle to be locked temporarily to said tractor vehicle. Said locking of the towed vehicle to the tractor vehicle also involves the connection of communication links and possibly other conduits such as compressed-air lines. An example of said communication links is described in more detail with reference to FIG. 2 below.

The term "link" refers herein to a communication link which may be a physical conduit, such as an opto-electronic communication line, or a non-physical conduit such as a wireless connection, e.g. a radio link or microwave link.

Figure 2:
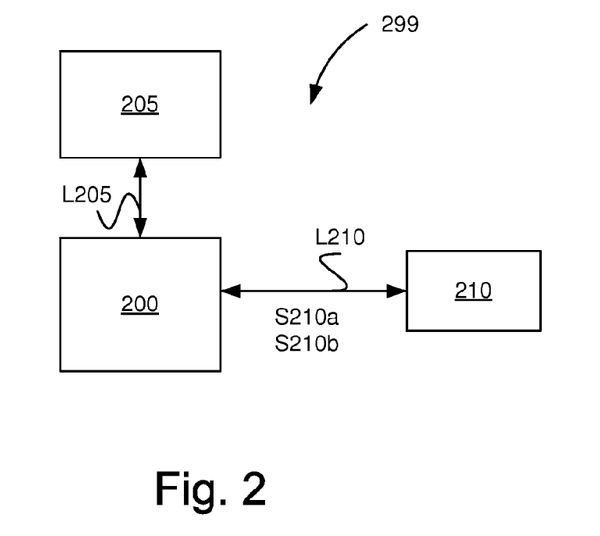
FIG. 2 illustrates schematically a system pertaining to the vehicle depicted in FIG. 1, according to an embodiment of the invention.

FIG. 2 depicts a system 299 pertaining to the vehicle combination 100.

The tractor vehicle 110 is provided with a first control unit 200 which may be a brake control unit of the vehicle combination 100. The first control unit comprises functionality for an electronic brake system of the vehicle combination. The first control unit comprises also a function for regulating the distribution of braking force of electronically activable brakes of the vehicle combination. Said brakes may be service brakes intended and arranged to friction-brake the vehicle combination. Said brakes may be of suitable kinds. They may comprise so-called supplementary brakes. Said regulation may comprise continuously controlling the distribution of braking force between brake systems of said tractor vehicle and said towed vehicle.

The first control unit 200 is suited to communication with a second control unit 210 via a link L210 which may comprise a CAN bus. Said CAN bus may be associated with standard ISO 11992. The second control unit 210 may be a brake control unit pertaining to the towed vehicle 112. The second control unit 200 comprises a unique ID specification which may itself comprise a vehicle identification number (VIN). Said ID specification is associated with said towed vehicle. The second control unit 210 comprises also a function for regulating the distribution of braking force of electronically activable brakes of the towed vehicle. Said brakes may be service brakes intended and arranged for the friction-braking of wheels. Said braking force distribution is conducted by the second control unit 210 but depends on information comprising data about the total braking force to be applied to said towed vehicle. The first control unit 200 is arranged to control the braking force distribution on the tractor vehicle 110 and also to inform said second control unit 210 about appropriate brake action on said towed vehicle 112. To this end, the first control unit is arranged to continuously determine a braking force distribution of the vehicle combination in order to achieve so-called brake balance between the tractor vehicle and the towed vehicle. Said brakes of the vehicle combination are not depicted in this respect.

The first control unit 200 and the second control unit 210 are arranged to continuously determine adaptation data as a basis for said function for regulating the braking force distribution of the vehicle combination 100. The first control unit 200 is arranged to continuously save generated adaptation data concerning at least said towed vehicle in a memory therein. The first control unit is arranged to respond to coupling of said tractor vehicle 110 to said towed vehicle 112 by sending a signal S210a which conveys a demand to receive said ID specification from said second control unit via said link L210. The second control unit is arranged to respond to receiving said signal S210a by sending a signal S210b which conveys data about said ID specification to said first control unit via said link L210. The first control unit is arranged to save in a register said ID specification received. The first control unit is further arranged to continuously or intermittently save in said register generated adaptation data together with said ID specification. This may be done for a number of different towed vehicles, in which case said accumulating first control unit 200 may store information about adaptation data relating to unique towed vehicles.

Said adaptation data may comprise information about the towed vehicle's braking characteristics, which may comprise information about how the towed vehicle is braked in certain circumstances pertaining for example to the speed of the vehicle combination 100. Said adaptation data may comprise information about a relationship about braking force and prevailing brake pressure of the towed vehicle's brakes. Said adaptation data may comprise information such as the respective weights of the tractor vehicle and the towed vehicle, the prevailing acceleration or retardation of the vehicle combination or the rotation speeds of its wheels etc. Said adaptation data are used as a basis in said function for regulating the brake force of the vehicle combination. Said adaptation data may be generated by said second control unit 210 during braking processes of the vehicle combination.

The first control unit 200 is further arranged to respond to coupling of the tractor vehicle 110 and any towed vehicle by checking whether said specific towed vehicle has been previously coupled to the tractor vehicle 110, which is effected by determining whether an ID specification for the respective towed vehicle is stored in said register or not. In cases where said ID specification is stored in said register from before, the first control unit is arranged to provide corresponding saved adaptation data to said function for regulating the braking force distribution of the vehicle combination.

A third control unit 205 is arranged for communication with the first control unit 200 via a link L205. The third control unit may be detachably connected to the first control unit. The third control unit may be a control unit external to the tractor vehicle 100. The third control unit may be arranged to perform the method steps according to the invention. The third control unit may crossload program code to the first control unit 200, particularly program code for conducting the method according to the invention. The third control unit may alternatively be arranged for communication with the first control unit via an internal network of the vehicle. The third control unit may be arranged to perform substantially similar functions to those of the first control unit.

Figure 3A:
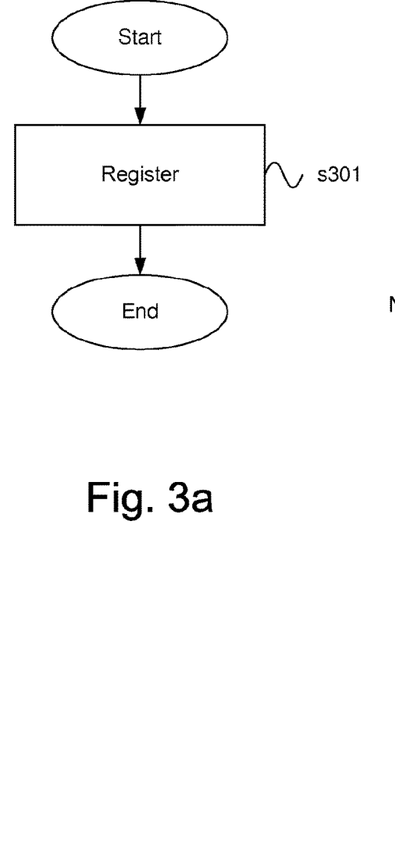
FIG. 3a illustrates schematically a flowchart of a method according to an embodiment of the invention.

FIG. 3a is a schematic flowchart illustrating a method pertaining to braking of a vehicle combination which comprises a tractor vehicle with a towed vehicle where both said tractor vehicle and said towed vehicle are arranged to be braked and where said tractor vehicle is provided with a first control unit comprising a function for regulation of coupling force between said tractor vehicle and said towed vehicle, where said regulation of coupling force comprises adaptation data and where said towed vehicle bears an ID specification. The method comprises a first step s301 comprising the steps of:
  transferring said ID specification from said towed vehicle to said tractor vehicle;
  during a braking process, registering adaptation data associated with said braking process together with said ID specification.

The method ends after step s301.

Figure 3B:
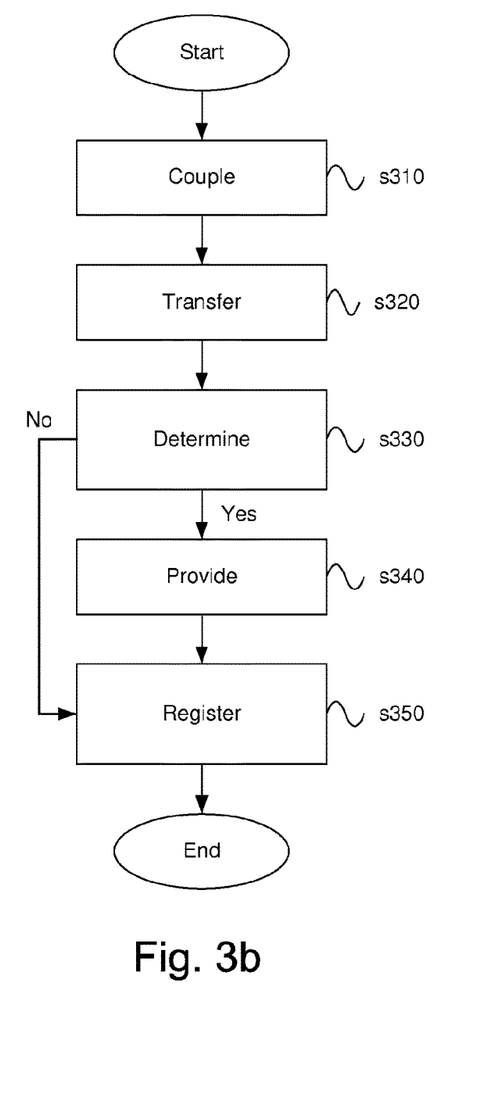
FIG. 3b illustrates schematically a more detailed flowchart of a method according to an embodiment of the invention.

FIG. 3b illustrates schematically a flowchart illustrating a method pertaining to braking of a vehicle combination which comprises a tractor vehicle with a towed vehicle where both said tractor vehicle and said towed vehicle are arranged to be braked and where said tractor vehicle is provided with a first control unit comprising a function for regulation of coupling force between said tractor vehicle and said towed vehicle, where said regulation of coupling force comprises so-called adaptation data and where said towed vehicle bears an ID specification. Said regulation of coupling force between said tractor vehicle and said towed vehicle may be effected by continuously controlling the distribution of braking force between brake systems of said tractor vehicle and said towed vehicle.

The method comprises a first step s310 comprising the step of coupling said tractor vehicle 112 to said towed vehicle 110. Said coupling comprises the step of setting up a linking connection for communication between said first control unit 200 and said second control unit 210, e.g. via the link L210. Step s310 is followed by a step s320.

Method step s320 may comprise the step of transferring said ID specification from said second control unit 210 to said first control unit 200, which may take place automatically. It may take place in response to a demand sent from said first control unit to said second control unit. Step s320 is followed by a step s330.

Method step s330 may comprise the step of responding to coupling of said tractor vehicle 110 to said towed vehicle 112 with a certain ID specification by determining whether said tractor vehicle's first control unit 200 has adaptation data already registered in it which pertain to the respective towed vehicle. If said tractor vehicle's first control unit has adaptation data already registered in it which pertain to the respective towed vehicle, i.e. "Yes", a step s340 follows. If said tractor vehicle's first control unit does not have adaptation data already registered in it which pertain to the respective towed vehicle, i.e. "No", a step s350 follows.

Method step s340 may comprise the step of providing said function for regulation of coupling force between said tractor vehicle 110 and said towed vehicle 112 with adaptation data thus registered. Step s340 may comprise the step of using these already registered adaptation data as a basis for said function for regulation of coupling force between said tractor vehicle and said towed vehicle. Step s340 is followed by a step s350.

Method step s350 comprises the step, during at least one braking process of the vehicle combination 100, of registering adaptation data associated with said braking process together with said ID specification in a memory of the first control unit 200. This registration takes place with advantage automatically, obviating any need for interaction with the driver of the vehicle.

The method ends after step s350.

Figure 4:
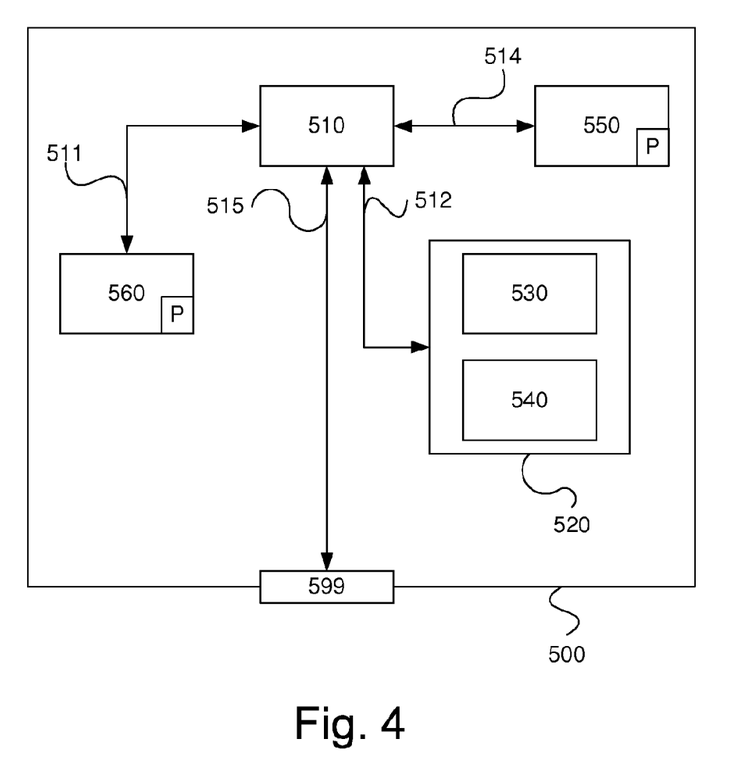
FIG. 4 illustrates schematically a computer according to an embodiment of the invention.

FIG. 4 is a diagram of one version of a device 500. The control units 200, 205 and 210 described with reference to FIG. 2 may in one version comprise the device 500 which itself comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A computer program P is proposed for control of braking of a vehicle combination which comprises a tractor vehicle with a towed vehicle where both said tractor vehicle and said towed vehicle are arranged to be braked and where said tractor vehicle is provided with a first control unit comprising a function for regulation of coupling force between said tractor vehicle and said towed vehicle, where said regulation of coupling force comprises so-called adaptation data and where said towed vehicle bears an ID specification.

Said ID specification may be stored in a non-volatile memory 520.

The computer program P may comprise routines for transferring said ID specification from said towed vehicle to said tractor vehicle, which may take place automatically. The program may comprise routines for registering, during a braking process, adaptation data associated with said braking process together with said ID specification.

The computer program P may comprise routines for providing said function for regulation of coupling force between said tractor vehicle and said towed vehicle with adaptation data thus registered. The program may comprise routines for responding to coupling of said tractor vehicle to a towed vehicle with a certain ID specification by determining whether said tractor vehicle's first control unit has adaptation data already registered in it which pertain to the respective towed vehicle. The program may comprise routines for using these already registered adaptation data as a basis for said function for regulation of coupling force between said tractor vehicle and said towed vehicle. The program may comprise routines for using said tractor vehicle's first control unit to continuously register adaptation data and ID specifications for different towed vehicles coupled to the tractor vehicle. This continuous registration takes place with advantage automatically.

The program P may be stored in an executable form or in compressed form in a memory 560 and/or in a read/write memory 550.

Where the data processing unit 510 is described as performing a certain function, it means that the data processing unit conducts a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit via a data bus 514. The links L205 and L210 for example may be connected to the data port (see FIG. 2).

When data are received on the data port 599, they are stored temporarily in the second memory element 540. When input data received have been temporarily stored, the data processing unit 510 will be prepared to conduct code execution as described above. In one version signals received on the data port contain information about a demand for an ID specification, said ID specification, adaptation data concerning said towed vehicle.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention has been provided to illustrate and describe the invention. It is not intended to be exhaustive, nor to restrict the invention to the variants described. Many modifications and variations will obviously suggest themselves to one skilled in the art. The embodiments were chosen and described in order best to explain the principles of the invention and their practical applications and thereby make it possible for one skilled in the art to understand the invention for different embodiments and with the various modifications appropriate to the intended use.

The invention claimed is:

1. A method of braking a vehicle combination;
the method comprising steps of:
transferring, by a transfer device, from a towed vehicle, included in said vehicle combination, a unique ID specification of said towed vehicle to a tractor vehicle included in said vehicle combination, said towed vehicle being coupled to said tractor vehicle;
beginning a braking process of said vehicle combination; and
during said braking process, registering, by a registering device, adaptation data associated with said braking process together with said unique ID specification of said towed vehicle;
wherein said tractor vehicle is provided with a first control unit comprising a function for regulation of coupling force between said tractor vehicle and said towed vehicle that are coupled together, said regulation of said coupling force comprises using said adaptation data associated with said braking process,
the method further comprising the step of:
regulating said coupling force between said tractor vehicle and said towed vehicle by said function for said regulation of said coupling force using said adaptation data which has been registered by said registering device.

2. The method according to claim 1, comprising further steps which are performed during said coupling of said tractor vehicle to said towed vehicle;
the further steps being:
determining whether said first control unit of said tractor vehicle has said adaptation data already registered in it which pertain to said towed vehicle being coupled to said tractor vehicle; and
regulating said coupling force between said tractor vehicle and said towed vehicle using said adaptation data which has been registered by said registering device.

3. The method according to claim 2, further comprising a step of:
for said first control unit of said tractor vehicle, continuously registering said adaptation data and said unique ID specification for each of different ones of towed vehicles coupled to said tractor vehicle.

4. A non-transitory computer-readable storage medium storing a program code for causing an electronic control unit or a computer connected to said electronic control unit to perform method steps according to claim 1, when said program code is run on said electronic control unit or said computer connected to said electronic control unit.

5. The method according to claim 1, wherein said tractor vehicle and said towed vehicle are configured and operative so that said tractor vehicle will tow said towed vehicle.

6. The method according to claim 1, wherein said adaptation data comprises at least one of:
first information about braking characteristics of said towed vehicle received by said tractor vehicle;
second information as to how said towed vehicle is braked in particular circumstances of braking said towed vehicle;
third information about a relationship between braking force and a prevailing brake pressure of the brakes of said towed vehicle;
fourth information about respective weights of said tractor vehicle and said towed vehicle;

fifth information about prevailing acceleration or retardation of said vehicle combination; and sixth information about rotation speeds of wheels of said vehicle combination;

wherein the method further comprises a step of:

supplying at least one of said information to the first control unit for said regulation of said coupling force.

7. The method according to claim 1, further comprising a step of:

providing said function for said regulation of said coupling force between said tractor vehicle and said towed vehicle using said adaptation data and said unique ID specification.

8. The method according to claim 1, wherein said adaptation data comprises at least one of: (1) a prevailing acceleration or retardation of said vehicle combination; and (2) respective weights of said tractor vehicle and said towed vehicle.

9. A system for braking a vehicle combination, wherein:

said vehicle combination comprises a tractor vehicle coupled to a towed vehicle, the system comprises a first control unit, a transfer device, and a registering device, both of said tractor vehicle and said towed vehicle are configured to be braked;

said tractor vehicle has said first control unit which comprises a function for regulation of a coupling force between said tractor vehicle and said owed vehicle, said regulation of coupling force comprises using adaptation data associated with a braking process and said towed vehicle bears a unique ID specification;

said transfer device is configured for transferring said unique ID specification from said towed vehicle to said tractor vehicle; and said registering device is configured so that during said braking process, said registering device registers said adaptation data together with said unique ID specification of said towed vehicle.

10. The system according to claim 9, further comprising:

a device configured for providing said function for regulation of said coupling force between said tractor vehicle and said towed vehicle with said adaptation data which has been registered by said registering device.

11. The system according to claim 10, further comprising:

a determining device being configured and operable such that during coupling of said tractor vehicle to a certain towed vehicle having a certain unique ID specification, said determining device determines whether said first control unit of said tractor vehicle has adaptation data already registered in it which pertains to said certain towed vehicle; and a device for function regulation configured for using said already registered adaptation data as a basis for said function for regulation of said coupling force between said tractor vehicle and said towed vehicle.

12. The system according to claim 9, wherein:

said registering device continuously registers said adaptation data and said unique ID specification for each of respective different ones of towed vehicles coupled to said tractor vehicle having said first control unit.

13. The system according to claim 9, wherein said towed vehicle has a second control unit arranged to bear its said unique ID specification.

14. A motor vehicle provided with the system according to claim 9.

15. The motor vehicle according to claim 14, in the form of a truck, timber carrier or forestry machine.

16. The system according to claim 9, wherein said adaptation data comprises at least one of: (1) a prevailing acceleration or retardation of said vehicle combination; and (2) respective weights of said tractor vehicle and said towed vehicle.

17. A method of braking a vehicle combination;

the method comprising the steps of:

transferring from a towed vehicle, included in said vehicle combination, an ID specification of said towed vehicle to a tractor vehicle, included in said vehicle combination, said towed vehicle being coupled to said tractor vehicle;

beginning a braking process of said vehicle combination; and during said braking process, registering adaptation data associated with said braking process together with said ID specification of said towed vehicle;

wherein said tractor vehicle is provided with a first control unit comprising a function for regulation of coupling force between said tractor vehicle and said towed vehicle that are coupled together, said regulation of said coupling force comprises using said adaptation data associated with said braking process, and said regulation of coupling force is effected by continuously controlling a distribution of braking force between brake systems of said tractor vehicle and said towed vehicle, the method further comprising the step of:

regulating said coupling force between said tractor vehicle and said towed vehicle using said adaptation data which has already been registered.

18. The method according to claim 17, wherein:

prior to said tractor vehicle and said towed vehicle being coupled and during said coupling of said tractor vehicle to said towed vehicle, said towed vehicle has its respective ID specification and said tractor vehicle has a first control unit;

the method further comprising the step of:

determining whether said first control unit of said tractor vehicle has said adaptation data already registered in it which pertain to said towed vehicle being coupled to said tractor vehicle.

19. The system according to claim 17, wherein said ID specification of said towed vehicle comprises a vehicle identification unique to said towed vehicle and said tractor vehicle has a function for distribution of braking force of said tractor vehicle.

20. A tractor vehicle for use in a vehicle combination, wherein:

said tractor vehicle is configured to be coupled to a towed vehicle;

both of said tractor vehicle and said towed vehicle, which is coupled to said tractor vehicle, are configured to be braked;

said tractor vehicle has a first control unit configured to perform a function for regulation and distribution of a coupling force between said tractor vehicle and said towed vehicle;

said first control unit is configured to regulate said coupling force by using adaptation data for said braking, said adaptation data being in said tractor vehicle;

said tractor vehicle is configured to receive an ID specification of said towed vehicle which is coupled to said tractor vehicle;

a registering device is configured so that during said braking, said registering device registers said adaptation data together with said ID specification of said towed vehicle; and said regulation of coupling force is effected by continuously controlling a distribution of braking force between brake systems of said tractor vehicle and said towed vehicle.

21. The tractor vehicle according to claim 20, further comprising:

a device configured for providing said registered adaptation data to said function for regulation of said coupling force between said tractor vehicle and said towed vehicle.

\* \* \* \* \*